US010506469B1

(12) United States Patent
Gottardi et al.

(10) Patent No.: US 10,506,469 B1
(45) Date of Patent: Dec. 10, 2019

(54) RESILIENT IN-BAND MOBILE CORE USER PLANE FUNCTION SELECTION USING SEGMENT ROUTING LOAD BALANCING

(71) Applicant: Cisco Technology, Inc., San Jose, CA (US)

(72) Inventors: Guillaume Gottardi, Malakoff (FR); William Mark Townsley, Paris (FR); Eric Philippe Hamel, Paris (FR); Yoann Desmouceaux, Paris (FR); Pierre Pfister, Chalons-en-Champagne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/030,956

(22) Filed: Jul. 10, 2018

Related U.S. Application Data

(60) Provisional application No. 62/672,761, filed on May 17, 2018.

(51) Int. Cl.
*H04W 4/14* (2009.01)
*H04W 28/08* (2009.01)
*H04L 29/08* (2006.01)
*H04L 29/12* (2006.01)

(52) U.S. Cl.
CPC ......... *H04W 28/08* (2013.01); *H04L 61/2007* (2013.01); *H04L 67/141* (2013.01)

(58) Field of Classification Search
CPC ..... H04L 61/2007; H04L 67/02; H04L 45/02; H04L 63/102; H04L 41/0816; H04L 41/4604; H04L 41/048; H04L 43/0811; H04L 61/2015; H04L 61/1511; H04L 61/2061; H04L 47/125; H04L 12/4604; H04L 45/38; H04L 45/58; H04L 67/1006; H04W 28/0215; H04W 24/08; H04W 12/06; H04W 40/34; H04W 40/02;
(Continued)

(56) References Cited

U.S. PATENT DOCUMENTS 8,839,346 B2 * 9/2014 Murgia ................. H04L 63/102
726/1
9,178,805 B2 * 11/2015 Goel ....................... H04L 45/30
9,432,269 B2 * 8/2016 Annamalaisami ...... H04L 43/04
(Continued)

FOREIGN PATENT DOCUMENTS

CN         106912012 A      6/2017
EP           3113539 A1      1/2017

OTHER PUBLICATIONS

Michael Mitzenmacher, "The Power of Two Choices in Randomized Load Balancing", IEEE Transactions on Parallel and Distributed Systems, vol. 12, No. 10, Oct. 2001, 11 pages.
(Continued)

*Primary Examiner* — Jung Liu
(74) *Attorney, Agent, or Firm* — Edell, Shapiro & Finnan, LLC

(57) ABSTRACT

A user plane selection mechanism is provided that leverages an in-band load balancing scheme, e.g., Segment Routing Load Balancing (SRLB). Information in the form of segment identifiers (complemented by metadata) is passed to the components. As a result, the effective user plane function selection can be done in-band at the transport level.

20 Claims, 9 Drawing Sheets

(58) Field of Classification Search
CPC ..... H04W 28/08; H04W 12/08; H04W 64/00; H04W 80/04; H04W 88/16
See application file for complete search history.

(56) References Cited

U.S. PATENT DOCUMENTS

| | | | |
|---|---|---|---|
| 9,749,148 B2* | 8/2017 | Cj | ................. H04L 12/4641 |
| 2015/0124622 A1* | 5/2015 | Kovvali | ........... H04W 28/0215 370/236 |
| 2016/0219420 A1* | 7/2016 | Sah | ................. H04W 4/14 |
| 2017/0126618 A1* | 5/2017 | Bhaskaran | .......... H04L 61/2007 |
| 2017/0331789 A1* | 11/2017 | Kumar | ............... H04L 63/0272 |
| 2017/0367026 A1* | 12/2017 | Li | ................. H04W 12/06 |

OTHER PUBLICATIONS

C. Filsfils, et al., "IPv6 Segment Routing Header (SRH)", draft-ietf-6man-segment-routing-header-14, Network Working Group, Internet-Draft, Jun. 28, 2018, 29 pages.
Y. Desmouceaux, et al., "SRLB: The Power of Choices in Load Balancing with Segment Routing", 2017 IEEE 37th International Conference on Distributed Computing Systems, Jun. 5-8, 2017, 6 pages.

* cited by examiner

| IPv6 HEADER | SA = C::, DA = S1 |
|---|---|
| SR HEADER | ( VIP, S2, S1 )  SL=2 |
| PROTOCOL (GTP, Sx) ||

SRv6 HEADER EXAMPLE WITH 2 SEGMENT IDs (S1, S2)

RESILIENT IN-BAND MOBILE CORE USER PLANE FUNCTION SELECTION USING SEGMENT ROUTING LOAD BALANCING

PRIORITY CLAIM

This application claims priority to U.S. Provisional Application No. 62/672,761, filed May 17, 2018, the entirety of which is incorporated herein by reference.

TECHNICAL FIELD

The present disclosure relates to mobile core network infrastructure.

BACKGROUND

Introduced for the 4G network, control and user plane separation is at the essence of the future 5G mobile network architecture. As a session is first established with the control plane, the selection of a user plane function is an important function. Selection of a user plane function is performed by the control plane element based on various information including location, service, capabilities and load. Some of this information (e.g., load) typically involves feedback between the two components.

BRIEF DESCRIPTION OF THE DRAWINGS

FIG. 2B illustrates a Segment Routing header including segment identifiers to identify two user plane functions to be used for serving a function, according to an example embodiment.

DESCRIPTION OF EXAMPLE EMBODIMENTS

Overview

Figure 1:
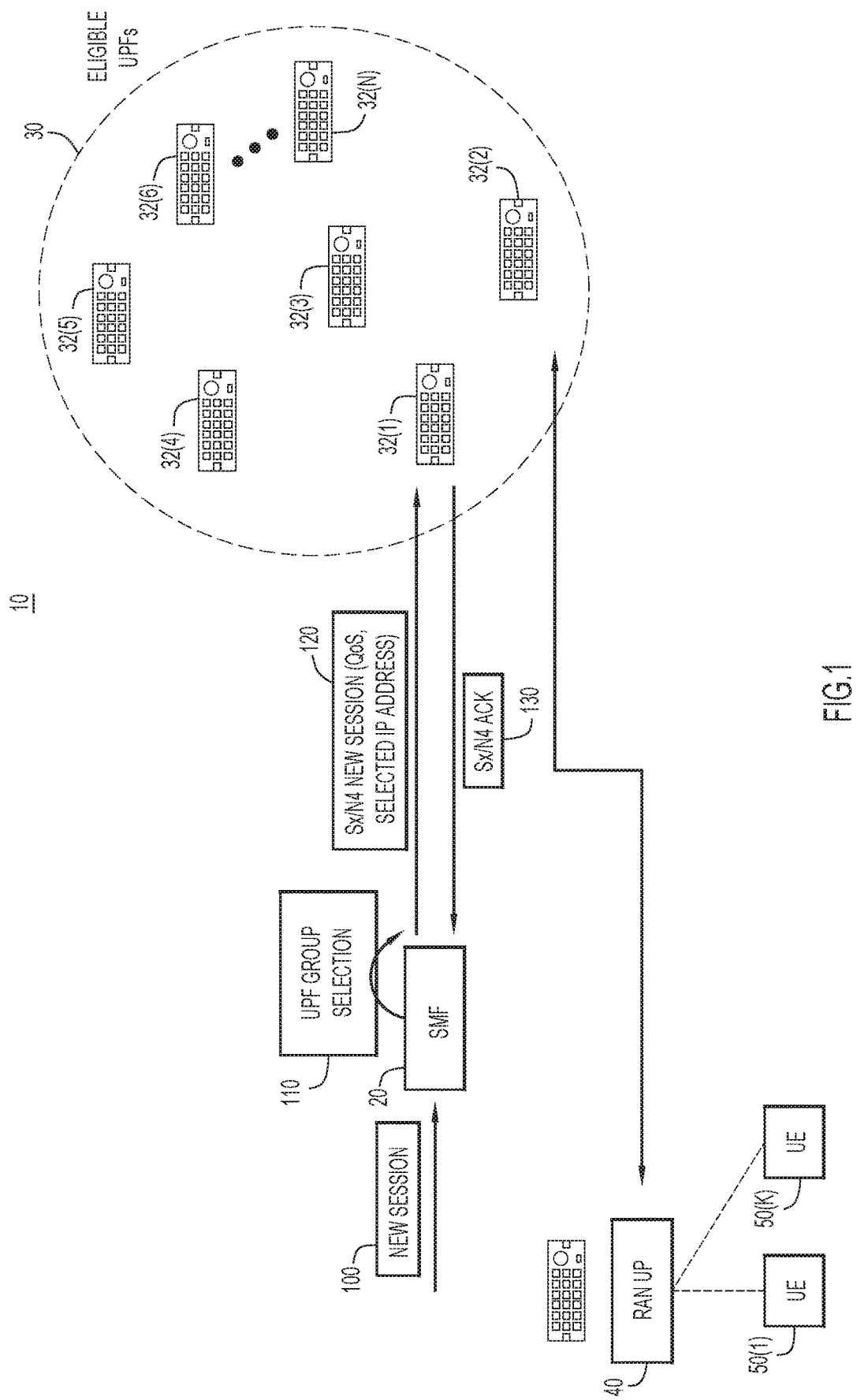
FIG. 1 is a diagram of a mobile core infrastructure environment illustrating a conventional user plane selection mechanism.

Presented herein are techniques to simplify the mobile core user plane selection process by in-band load balancing techniques. A user plane selection mechanism is provided that leverages an in-band load balancing scheme, e.g., Segment Routing Load Balancing (SRLB). Information in the form of a segment identifiers (optionally complemented by metadata) is passed to the components. As a result, the effective user plane function selection can be done in-band at the transport level.

In one embodiment, a session management function entity in a mobile core infrastructure network, obtains a new session request to invoke a user plane function for a session on behalf of a mobile user equipment. The session management function entity selects, from a pool of user plane function entities, a set of user plane function entities that are capable of serving the user plane function, the set including at least two user plane function entities. The session management function entity generates a new session notification that includes a segment routing header that includes a segment identifier for each of the at least two user plane function entities to indicate the set of user plane function entities, wherein the new session notification is to be received by a first user plane function entity in the set such that the first user plane function entity serves the session if it can serve the session, and otherwise the first user plane function entity forwards the new session notification to another user plane function entity in the set, and so on, until one of the user plane function entities in the set can serve the session, thereby achieving in-band load balancing among the user plane function entities in the set resulting in a selected user plane function entity to serve the session. The session management function entity obtains (receives) a response from the selected user plane function entity in the set that serves the session, the response including an identifier of the selected user plane function entity that serves the session and an Internet Protocol (IP) address allocated for the session.

In another embodiment, a user plane function entity that is part of a set of at least two user plane function entities in a mobile core infrastructure network, obtains a new session notification for a session on behalf of a mobile user equipment, the new session notification including a segment routing header that includes a segment identifier for each of the at least two user plane function entities in the set. The user plane function entity parses the segment routing header to obtain the segment identifiers for each of the one or more other user plane function entities specified in the segment routing header. The user plane function entity determines whether it can serve the session. If the user plane function entity cannot serve the session, it forwards the new session notification to a next user plane function entity in the set. If the user plane function entity can serve the session, it selects an Internet Protocol (IP) address for the session from a pool of available IP addresses, and sends a response to a session management function entity in the mobile core infrastructure network, the response including an identifier of the user plane function entity that serves the session and the IP address allocated for the session.

Example Embodiments

Mobile network service providers are considering evolving their network, introducing network slicing and separation of the control plane and user plane functions. These capabilities enable delivery of new use cases and allow a more flexible network deployment by distributing service capabilities of a network component where the service is actually required.

The consequence of this is that as the user is connecting or launching a new service, the proper user plane element should be selected. The selection is based on information, such as user location, application/traffic characteristics (e.g. for low latency use cases), service/content (e.g. cache), allocated Quality of Service (QoS), network load, etc. Some of this information is dynamic in nature and involves constant information exchange between the selecting and selected components (i.e., control plane and user plane). This is to be contrasted with more static selection criteria, such as location and application/traffic characteristics.

Presented herein are techniques that leverage a newly developed concept known as segment routing load balancing (SRLB) to improve the user plane selection process. SRLB is an in-band technique that allows for efficient load balancing. With SRLB, it is possible to pre-determine a set of n selected components. All targeted components are identified with a specific segment routing identifier (ID) that is added to the routing header. The actual load balancing is based on a recursive behavior whereby if the first targeted node is not able to admit a new session/flow, it passes the service request to the next node, leveraging a segment routing capability (i.e. passing to the next header). Experimentation of SRLB has shown that n=2 ("Power of 2") is sufficient to perform efficient load balancing.

For user plane selection, it is then proposed that the control plane element applies the above concept and selects a set of candidate user plane functions each identified with their own segment routing information. This information, in the form of segment routing IDs possibly complemented by metadata (as possible with SRv6), is transmitted. The metadata may be used to provide information about the new session to set up. The selection is then directly performed at the transport level by the user plane functions. Once the selection is complete, the user plane and control plane components finalize the user session/flow state association over an interface (e.g., the Sx interface per the 3GPP standards). This method does not require an initial message for the new session between the control component and user plane component because the necessary information has been exchanged during the Sx association establishment, and for the new session additional information may be passed in the segment routing header.

An advantage of this mechanism is that it allows for efficient load balancing without having to exchange load information. Moreover, state information about user plane usage does not need to be maintained. Also, being an in-band technique, it does not need an initial session information exchange between the control and user plane. Only when the user plane is selected, further information may be exchanged.

Reference is now made to FIG. 1. FIG. 1 illustrates a high-level diagram of a conventional technique for selection of a user plane function (UPF) in a mobile core infrastructure environment 10. FIG. 1 shows a Session Management Function (SMF) 20 and a pool 30 including a plurality of User Plane Functions (UPFs) 32(1) . . . 32(N). Both SMF and UPF refers to 5G network components as defined in 3GPP standards. The SMF 20 selects a UPF for and the UPF is in communication with a Radio Access Network (RAN) entity 40 that enables wireless communication with User Equipment (UE) devices 50(1) . . . 50(K).

The SMF 20 is responsible for session management with individual functions being supported on a per session basis. The SMF 20 allocates IP addresses to UEs, and selects and controls the UPF for data transfer. The SMF 20 also acts as the external point for all communication related to the various services offered and enabled in the user plane and how the policy and charging treatment for those services is applied and controlled.

The UPFs 32(1) . . . 32(N) may operate as separate Virtual Network Forwarders (VNFs) to serve as forwarding engines for user traffic. The UPFs 32(1) . . . 32(N) may perform a variety of function such as, Stateful Packet Inspection (SPI)/Deep Packet Inspection (DPI), traffic optimization and inline services Network Address Translation (NAT)/Firewall/Domain Name System (DNS) snooping, etc.

When a user session (for a particular one of the UEs 50(1) . . . 50(K)) starts at 100, the SMF 20, at 110, selects a UPF based on session/network information (location, load, user, services, etc.). The SMF 20 selects an IP address for the user session at the same time it selects the UPF. At 120, the SMF 20 sends a session request to the selected UPF, e.g., UPF 32(1) with a specified Quality of Service (QoS). The session request includes the selected IP address by the SMF 20.

Figure 2A:
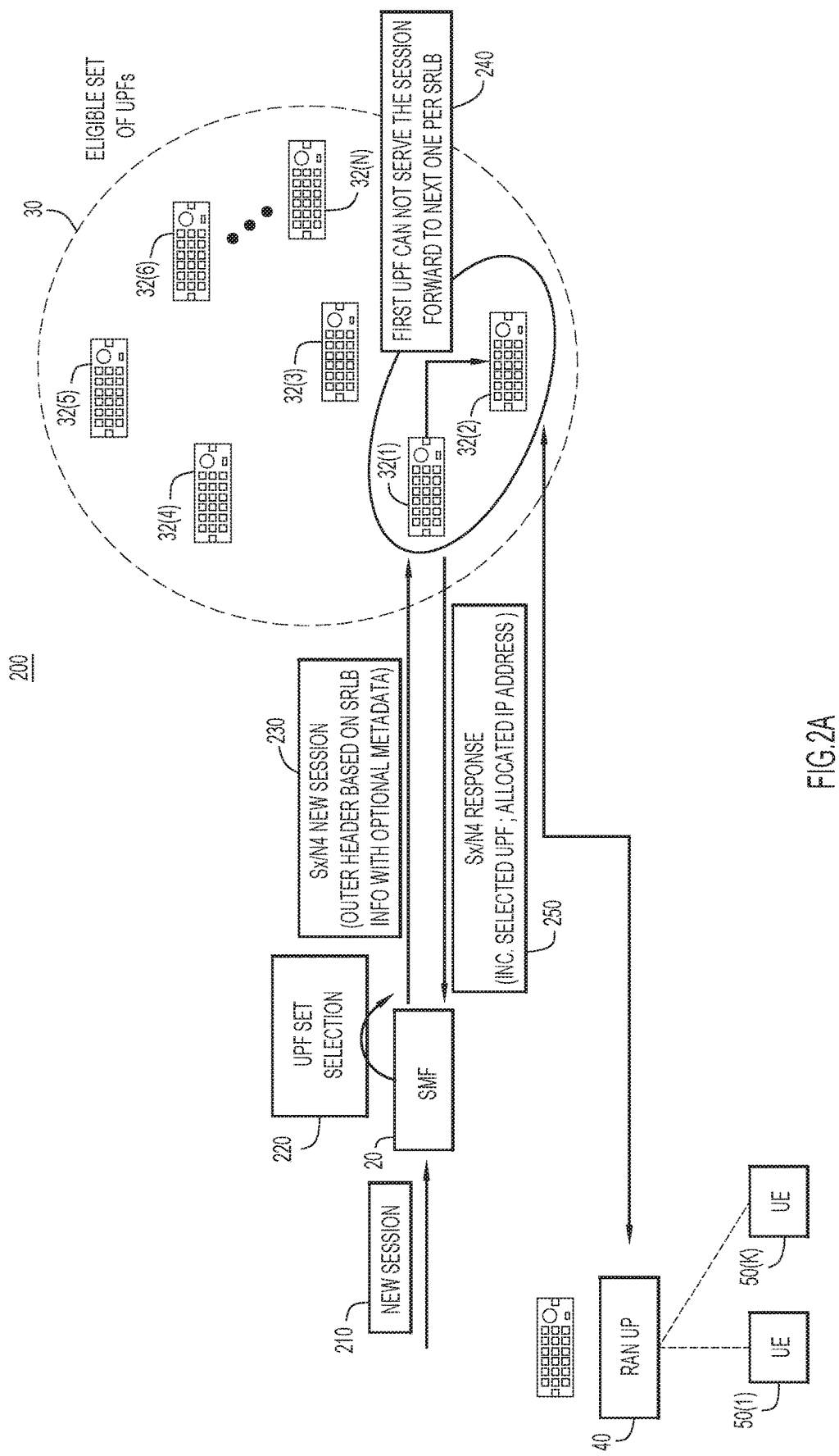
FIG. 2A is a diagram of a mobile core infrastructure environment illustrating a user plane selection mechanism using Segment Routing Load Balancing techniques, according to an example embodiment.

Reference is now made to FIG. 2A. FIG. 2A shows a mobile core infrastructure environment 200 that includes an SMF 20, a pool/set 30 of eligible UPFs 32(1) . . . 32(N), a RAN entity 40 and UEs 50(1) . . . 50(K). In the embodiment shown in FIG. 2A, when a new session is received by the SMF 20 at 210, then at 220, the SMF 20 selects a set of UPFs (minimum of 2) matching session/service requirements. This does not require out-of-band monitoring, but instead operates at the network level and is balanced among servers. At 230, the SMF 20 sends a new session notification to the selected (at least 2) UPFs, for example UPFs 32(1) and 32(2). The outer header of the new session notification is based on SRLB information (identifying the selected set of UPFs, such as UPFs 32(1) and 32(2)). This is shown in FIG. 2B where the Segment Routing (SR) Header includes a Virtual IP address (VIP), followed by "S2,S1" to indicate the selected set of UPFs, where S2 is 32(2) and S1 is 32(1), for example. The IPv6 header includes S1 as the destination address (DA), and the source address (SA) is "C" representing the address of the SMF 20. Moreover, as indicated at 230 in FIG. 2A, the SR header may further include optional metadata to provide information about the new session to set up.

In this example, the new session request 230 is received at UPF 32(1). However, as shown at 240, UPF 32(1) cannot serve the session (due to capacity or other issues) and, according to the SRLB techniques, forwards the session request to the next UPF in the selected set, e.g., to UPF 32(2) based on the information contained in the SR header shown in FIG. 2B. Assuming UPF 32((2) can serve the session, then at 250, UPF 32(2) sends a response that includes an identification of UPF 32(2) as the serving UPF and also the IP address allocated for the session. Moreover, the serving UPF 32(2) selects the IP address for the session based on an available pool of IP addresses. In the embodiment of FIG. 2, the IP address is not selected by the SMF, as in the scenario of FIG. 1.

Figure 3A:
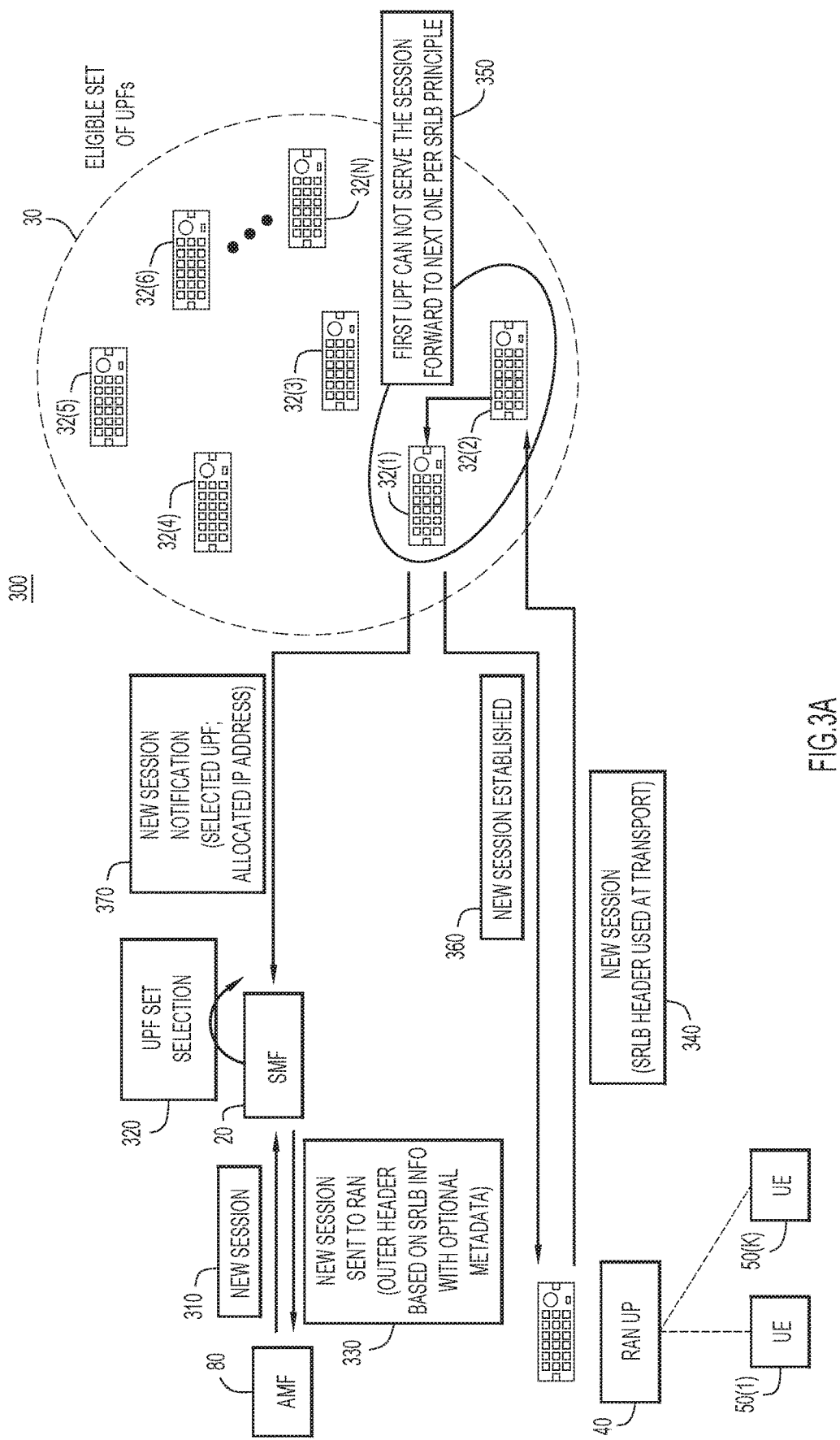
FIG. 3A is a diagram of a mobile core infrastructure environment illustrating a user plane selection mechanism, according to another example embodiment.
Figure 3B:
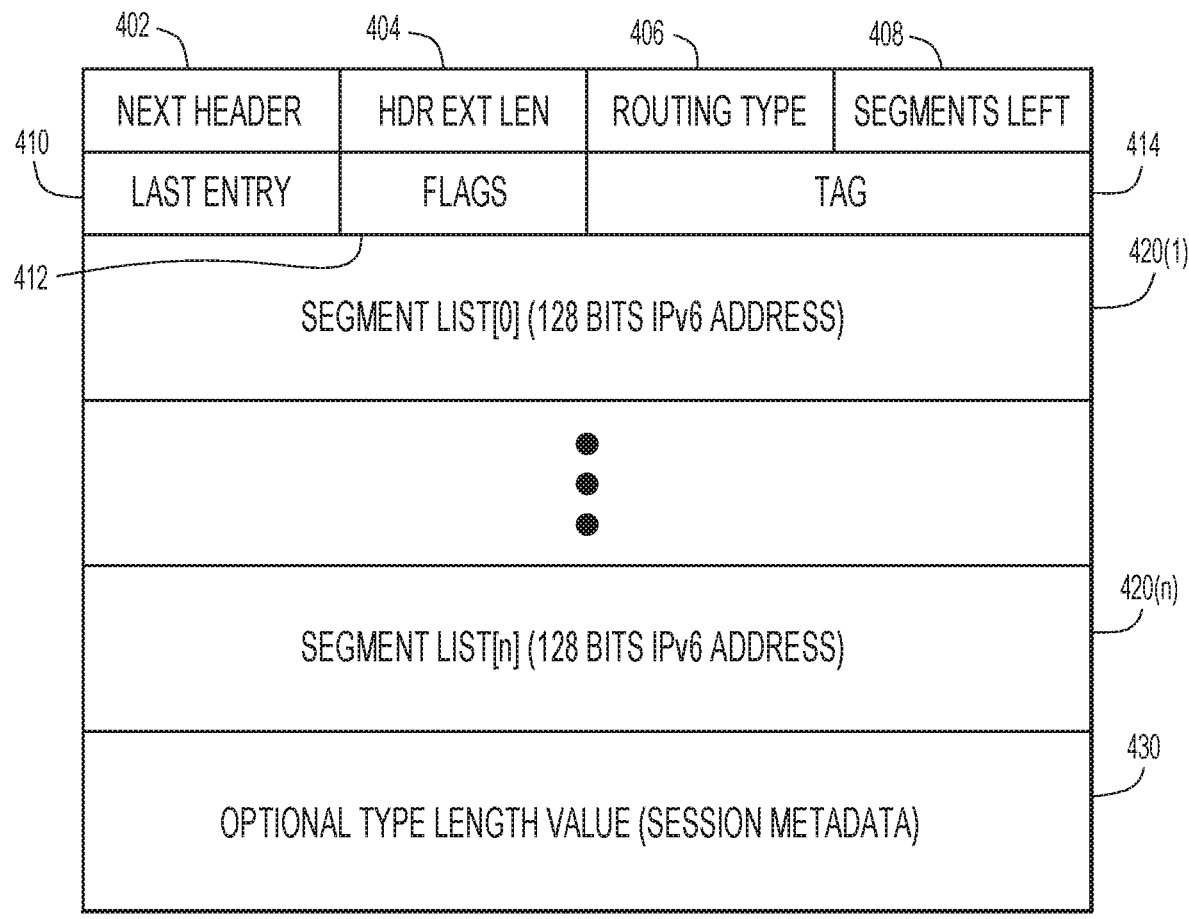
FIG. 3B is a detailed diagram of a Segment Routing header illustrating how metadata may be included in optional Type Length Values (TLVs), according to an example embodiment.

Reference is now made to FIG. 3A. FIG. 3A shows a mobile core infrastructure environment 300 similar to FIG. 2A, but illustrating a variation to the scenario shown in FIG. 2A. FIG. 3A further shows a Core Access and Mobility Management Function (AMF) 80 (not shown in FIGS. 1 and 2A). In the scenario shown in FIG. 3A, a new session is initiated at 310. At 320, the SMF 20 selects a set of UPF (minimum of 2) matching session/service requirements. At 330, the SMF 20 constructs a new session request having an outer header based on SRLB information with optional metadata to be used at an SGi interface and is sent to the RAN entity 40. Metadata may be transported in optional Type Length Values (TLVs) of the SR header, as shown in FIG. 3B (for the scenario of FIG. 3A as well as for the scenario of FIG. 2A). In one example, metadata may be used to indicate specific QoS information or to identify a charging policy. At 340, the RAN entity 40 sends a new session request having an SRLB header used at the transport layer to the selected set of UPFs, e.g., UPFs 32(1) and 32(2), similar to that shown in FIG. 2A.

In this example, the new session request 340 is received at UPF 32(2). However, as shown at 350, UPF 32(2) cannot serve the session (due to capacity or other issues) and, according to the SRLB techniques, forwards the session request to the next UPF in the selected set, e.g., to UPF 32(1). Assuming UPF 32((1) can serve the session, then at 360, UPF 32(1) sends to the RAN entity 40 a notification indicating that a new session is established. The serving UPF 32(1) selects the IP address for the session based on an available pool of IP addresses. At 370, the UPF 32(1) sends to the SMF 20 a new session notification. The new session notification includes a session identifier, an identification of UPF 32(1) as the serving UPF and also the IP address allocated for the session. Like the scenario shown in FIG. 2A, the mechanism shown in FIG. 3A does not require out-of-band monitoring, operates at network level and balances among servers.

Turning to FIG. 3B, a diagram is shown of a segment routing header, and in particular a SRv6 header, as defined in draft-ietf-6man-segment-routing-header-14. The header 400 includes a next header field 402, a header extension (ext) length (len) field 404, a routing type field 406, a segments left field 408, a last entry field 410, a flags field 412, and a tag field 414. The header 400 further includes fields 420(1) . . . 420(n) for n Segment Lists. Finally, the header 400 includes an optional TLV field 430; this is where the aforementioned metadata may be located in the segment routing header.

Figure 4:
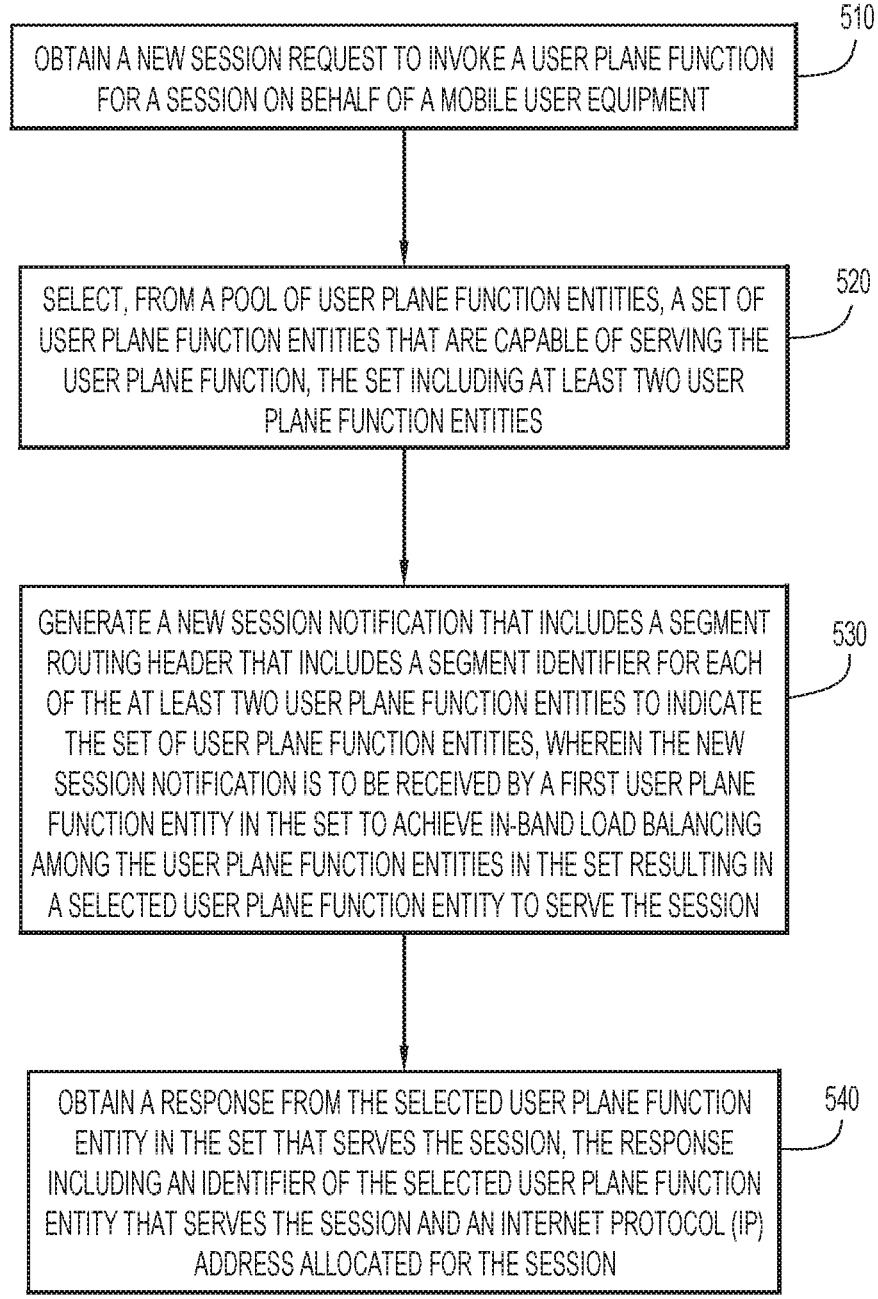
FIG. 4 is a flow chart depicting operations performed by a session management function entity, according to an example embodiment.

Reference is now made to FIG. 4. FIG. 4 illustrates a flow chart depicting a process 400 performed by the SMG 20. Reference is also made to FIGS. 2A, 2B, 3A and 3B in connection with the description of FIG. 4. The process 500 is performed a session management function entity, e.g., SMF 20, in a mobile core infrastructure network. At 510, a new session request is received/obtained by the session management function entity. The new session request is to invoke a user plane function for a session of behalf of a mobile user equipment, e.g., one of the UEs 50(1) . . . 50(K) shown in FIGS. 2A or 3A, At 520, the session management function entity selects, from a pool of user plane function entities, a set of user plane function entities that are capable of serving the user plane function. The set includes at least two user plane function entities.

At 530, the management function entity generates a new session notification that includes a segment routing header that includes a segment identifier for each of the at least two user plane function entities to indicate the set of user plane function entities. The new session notification is to be received by a first user plane function entity in the set such that the first user plane function entity serves the session if it can serve the session. Otherwise, if the first user plane function entity cannot serve the session (due to capacity overload issues, etc.) the first user plane function entity forwards the new session notification to another (a next) user plane function entity in the set, and so on. The process of forwarding on the new session notification to a next user plane function entity in the set continues, if necessary, until one of the user plane function entities in the set can serve the session, thereby achieving in-band load balancing among the user plane function entities in the set resulting in a selected user plane function entity to serve the session.

As described above in connection with FIG. 2A, the session management function entity sends the new session notification to the first user plane function entity of the set.

In another form, as described above in connection with FIG. 3A, the session management function entity sends the new session notification to a radio access network entity in the mobile core infrastructure network, and the radio access network entity sends the new session notification to the first user plane function entity in the set.

At 540, the session management function entity obtains (receives) a response from the selected user plane function entity in the set that serves the session. The response includes an identifier of the selected user plane function entity that serves the session and an Internet Protocol (IP) address allocated for the session. As explained above in connection with FIGS. 2A and 3A, the IP address allocated for the session is selected from an available pool of IP address by the selected user plane function entity.

The segment routing header may optionally include metadata that includes information about the session to be set up for the mobile user equipment. The metadata may be used to indicate various types of information, such as QoS information, a charging policy, etc. The metadata may be transported in optional TLV values of the segment routing header.

Figure 5:
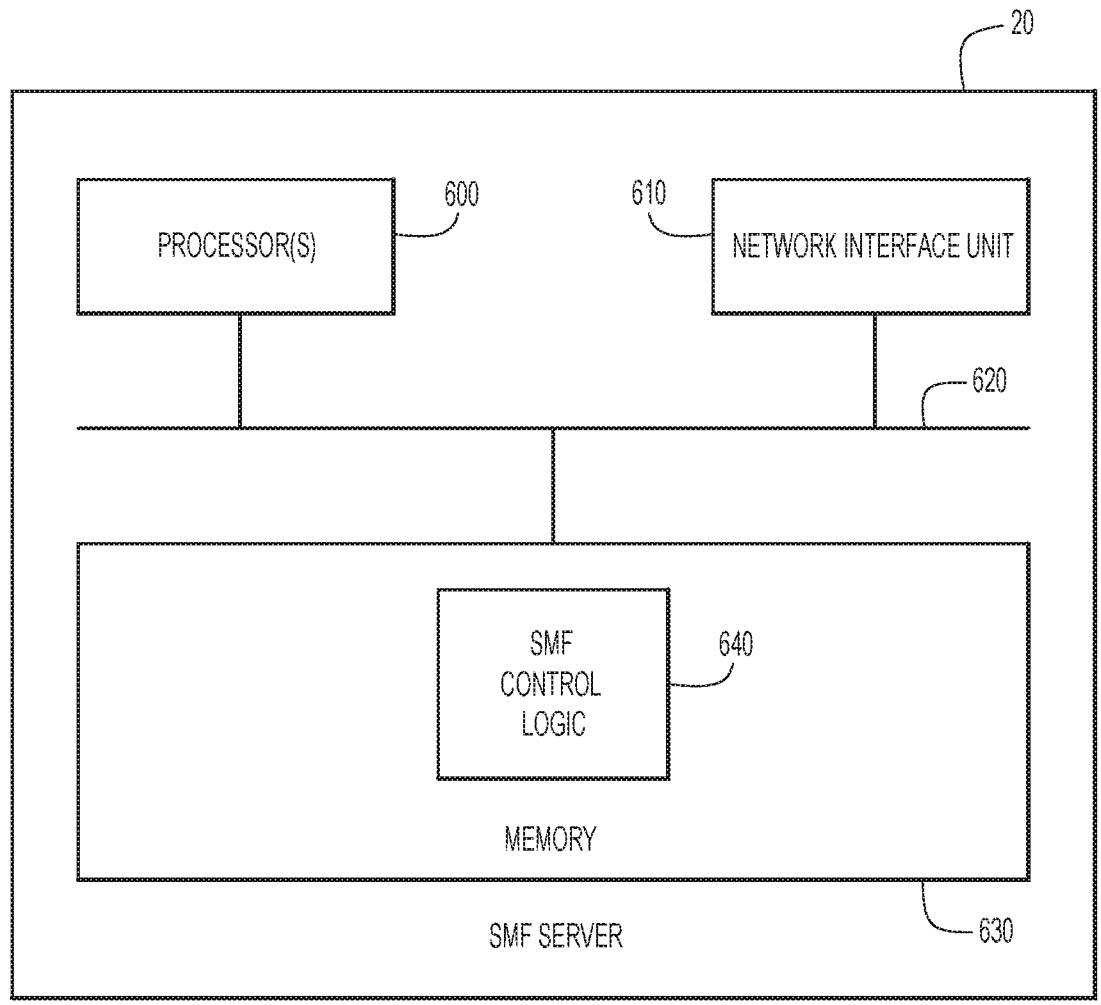
FIG. 5 is a block diagram of a session management function server configured to perform the session management function entity operations described herein, according to an example embodiment.

Reference is now made to FIG. 5. FIG. 5 illustrates a block diagram of an SMF server configured to perform the operations of the SMF 20. The SMF server 20 may include one or more processors 600, a network interface 610 configured to enable network communications, memory 630 and stored in memory 630 are software instructions for SMF control logic 640. The memory 630 may be read only memory (ROM), random access memory (RAM), magnetic disk storage media devices, optical storage media devices, flash memory devices, electrical, optical, or other physical/tangible memory storage devices. Thus, in general, the memory 630 may comprise one or more tangible (non-transitory) computer readable storage media (e.g., a memory device) encoded with software comprising computer executable instructions and when the software is executed (by the processor 600) it is operable to perform the SMF operations described above.

Figure 6:
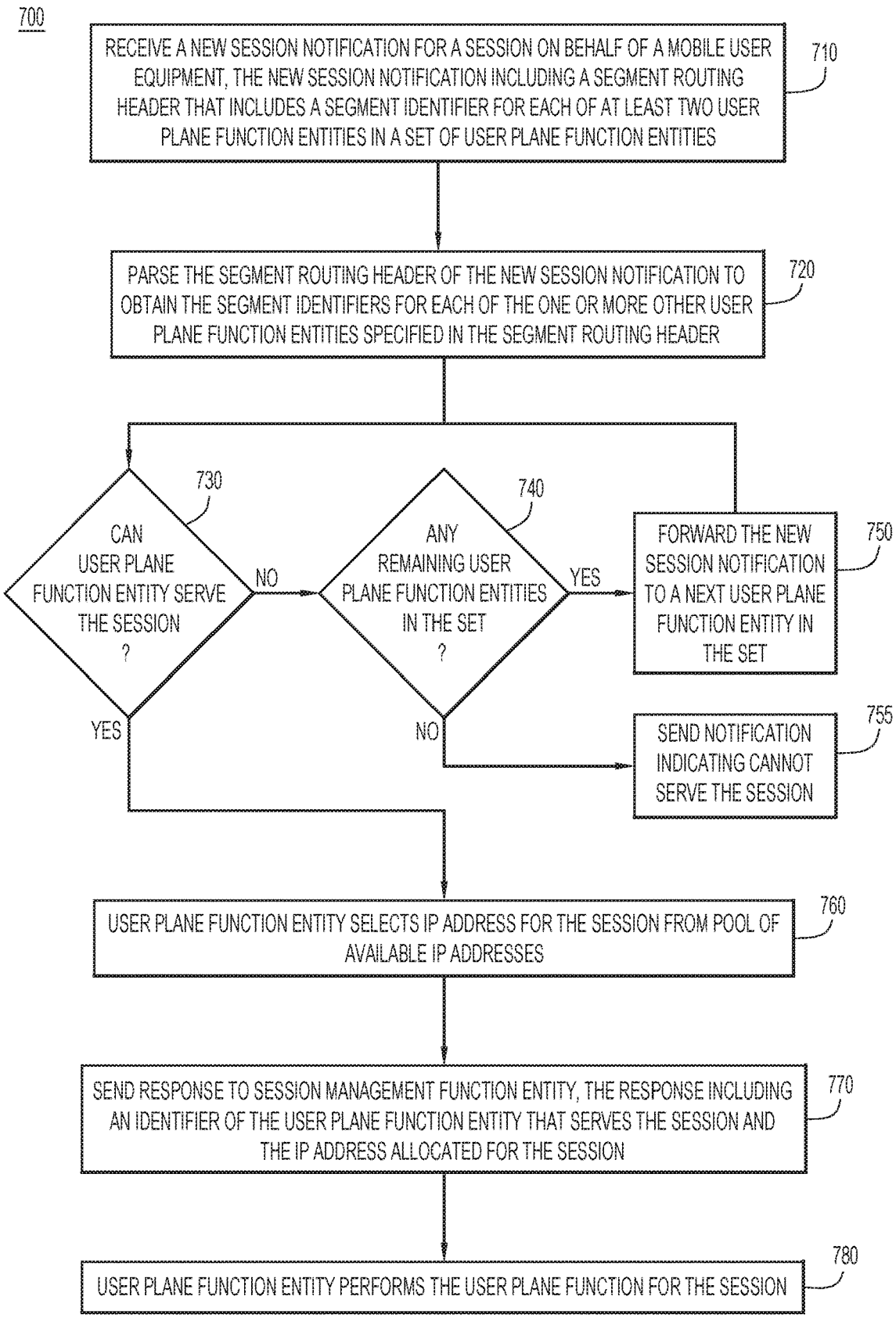
FIG. 6 is a flow chart depicting operations performed by a user plane function entity, according to an example embodiment.

Reference is now made to FIG. 6. FIG. 6 illustrates a flow chart for a process 700 performed by a user plane function entity according to the embodiments presented herein. The user plane function entity is part of a set of at least two user plane function entities in a mobile core infrastructure network. At 710, the user plane function entity receives a new session notification for a session on behalf of a mobile user equipment. The new session notification includes a segment routing header. The segment routing header includes a segment identifier for each of at least two user plane function entities in the set of user plane function entities. The new session notification may have been sent by a session management function entity (FIG. 2A) or by a radio access network entity (FIG. 3A).

At 720, the user plane function entity parses the segment routing header to obtain the identifiers for each of the one or more other user plane function entities specified in the segment routing header of the new session notification. At 730, the user plane function entity (the first user plane function entity in the first instance) determines whether, based on its capacity/workload, etc., whether it can serve the session. If the user plane function entity cannot serve the session, then at 740, it is determined whether there are any remaining user plane function entities in the set that have yet to be notified about serving the session. If at 740 it is determined there are one or more remaining user plane function entities in the set, then at 750, the user plane function entity forwards the new session notification to a next user plane function entity in the set. The process the repeats from operation 730. If at 740 it is determined that there are no remaining user plane function entities in the set, then at 755 the user plane function entity sends a notification (to the session management function entity, for example) indicating that the session cannot be served by any of the user plane function entities in the set.

If, at 730, it is determined that the user plane function entity can serve the session, then at 760, the user plane function entity selects the IP address for the session from a pool of available IP addresses. At 770, the user plane function entity sends a response to the session management function entity. The response includes an identifier of the user plane function entity that serves the session and the IP address allocated for the session. At 780, the user plane function entity performs the user plane functions for the session. If there is any metadata contained in the segment routing header (obtained during the parsing operation 720), the user plane function entity uses that metadata in setting up/and or serving the session.

Figure 7:
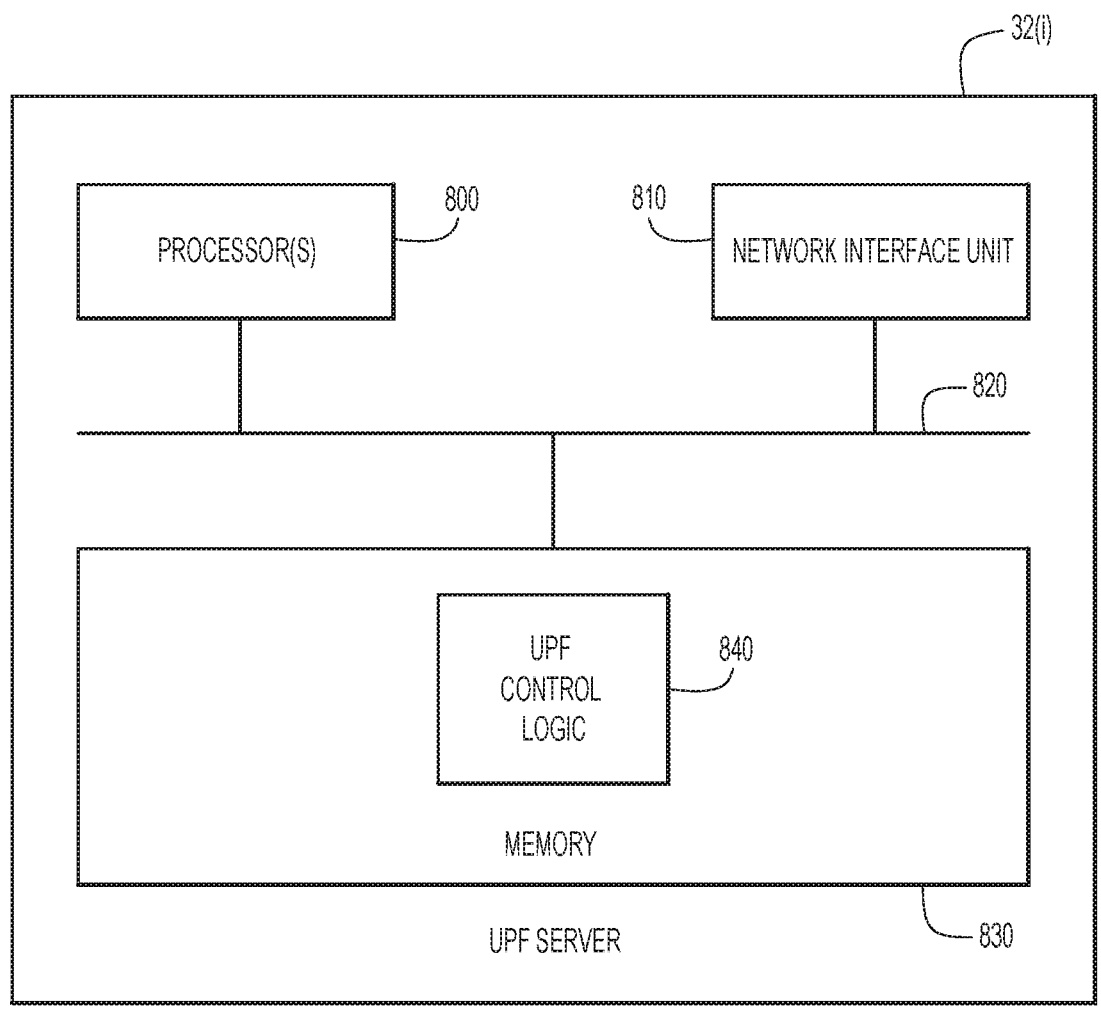
FIG. 7 is a block diagram of a user plane function server configured to perform the user plane management functions described herein, according to an example embodiment.

Reference is now made to FIG. 7. FIG. S illustrates a block diagram of an UPF server 32(i) configured to performed the operations of the SMF 32(1) . . . 32(N). The SMF server 32(i) may include one or more processors 700, a network interface 710 configured to enable network communications, memory 730 and stored in memory 730 software instructions for UPF control logic 740. The memory 730 may be ROM, RAM, magnetic disk storage media devices, optical storage media devices, flash memory devices, electrical, optical, or other physical/tangible memory storage devices. Thus, in general, the memory 730 may comprise one or more tangible (non-transitory) computer readable storage media (e.g., a memory device) encoded with software comprising computer executable instructions and when the software is executed (by the processor 700) it is operable to perform the UPF operations described above.

In summary, a user plane selection mechanism is provided that leverages an in-band load balancing scheme, e.g., Segment Routing Load Balancing (SRLB). Information in the form of a segment routing ID (complemented by metadata) is passed to the components. As a result, the effective user plane selection can be done at the transport level.

The use of an in-band technique, such as SRLB, allows for stateless UPF selection within a group of UPF. No load monitoring or other mechanisms is needed. IP address allocation done at the UPF rather than by the SMF, allowing for UPF stateless selection in a group. This allows for the possibility to select UPF at the transport level (i.e. between RAN and Core) rather than done at the core only, as depicted in FIG. 3.

In one form, a method is provided comprising, at a session management function entity in a mobile core infrastructure network: obtaining (receiving) a new session request to invoke a user plane function for a session on behalf of a mobile user equipment; selecting, from a pool of user plane function entities, a set of user plane function entities that are capable of serving the user plane function, the set including at least two user plane function entities; generating a new session notification that includes a segment routing header that includes a segment identifier for each of the at least two user plane function entities to indicate the set of user plane function entities, wherein the new session notification is to be received by a first user plane function entity in the set such that the first user plane function entity serves the session if it can serve the session, and otherwise the first user plane function entity forwards the new session notification to another user plane function entity in the set, and so on, until one of the user plane function entities in the set can serve the session, thereby achieving in-band load balancing among the user plane function entities in the set resulting in a selected user plane function entity to serve the session; and obtaining (receiving) a response from the selected user plane function entity in the set that serves the session, the response including an identifier of the selected user plane function entity that serves the session and an Internet Protocol (IP) address allocated for the session.

In another form, an apparatus is provided comprising: a network interface to enable network communications on behalf of a session management function entity in a mobile core infrastructure network; a processor coupled to the network interface, wherein the processor is configured to: obtain (receive via the network interface) a new session request to invoke a user plane function for a session on behalf of a mobile user equipment; select, from a pool of user plane function entities, a set of user plane function entities that are capable of serving the user plane function, the set including at least two user plane function entities; generate a new session notification that includes a segment routing header that includes a segment identifier for each of the at least two user plane function entities to indicate the set of user plane function entities, wherein the new session notification is to be received by a first user plane function entity in the set such that the first user plane function entity serves the session if it can serve the session, and otherwise the first user plane function entity forwards the new session notification to another user plane function entity in the set, and so on, until one of the user plane function entities in the set can serve the session, thereby achieving in-band load balancing among the user plane function entities in the set resulting in a selected user plane function entity to serve the session; and obtain (receive via the network interface) a response from the selected user plane function entity in the set that serves the session, the response including an identifier of the selected user plane function entity that serves the session and an Internet Protocol (IP) address allocated for the session.

In still another form., one or more non-transitory computer readable storage media are provided, encoded with instructions that, when executed by a processor of a session management function entity in a mobile core infrastructure network, cause the processor to perform operations including: obtaining (receiving) a new session request to invoke a user plane function for a session on behalf of a mobile user equipment; selecting, from a pool of user plane function entities, a set of user plane function entities that are capable of serving the user plane function, the set including at least two user plane function entities; generating a new session notification that includes a segment routing header that includes a segment identifier for each of the at least two user plane function entities to indicate the set of user plane function entities, wherein the new session notification is to be received by a first user plane function entity in the set such that the first user plane function entity serves the session if it can serve the session, and otherwise the first user plane function entity forwards the new session notification to another user plane function entity in the set, and so on, until one of the user plane function entities in the set can serve the session, thereby achieving in-band load balancing among the user plane function entities in the set resulting in a selected user plane function entity to serve the session; and obtaining (receiving) a response from the selected user plane function entity in the set that serves the session, the response including an identifier of the selected user plane function entity that serves the session and an Internet Protocol (IP) address allocated for the session.

In another form, a method is provided comprising, at a user plane function entity that is part of a set of at least two user plane function entities in a mobile core infrastructure network: obtaining (receiving) a new session notification for a session on behalf of a mobile user equipment, the new session notification including a segment routing header that includes a segment identifier for each of the at least two user plane function entities in the set; parsing the segment routing header to obtain the segment identifiers for each of the one or more other user plane function entities specified in the segment routing header; determining whether the user plane function entity can serve the session; if the user plane function entity cannot serve the session, forwarding the new session notification to a next user plane function entity in the set; if the user plane function entity can serve the session: selecting an Internet Protocol (IP) address for the session from a pool of available IP addresses; and sending a response to a session management function entity in the mobile core infrastructure network, the response including an identifier of the user plane function entity that serves the session and the IP address allocated for the session.

In still another form, an apparatus is provided comprising: a network interface to enable network communications on behalf of a user plane function entity in a mobile core infrastructure network; and processor coupled to the network interface, wherein the processor is configured to: obtain (receive via the network interface) a new session notification for a session on behalf of a mobile user equipment, the new session notification including a segment routing header that includes a segment identifier for each of the at least two user plane function entities in the set; parse the segment routing header to obtain the segment identifiers for each of the one or more other user plane function entities specified in the segment routing header; determine whether the user plane function entity can serve the session; if the user plane function entity cannot serve the session, forward the new session notification to a next user plane function entity in the set; if the user plane function entity can serve the session: select an Internet Protocol (IP) address for the session from a pool of available IP addresses; and send a response to a session management function entity in the mobile core infrastructure network, the response including an identifier of the user plane function entity that serves the session and the IP address allocated for the session.

In still another form, one or more non-transitory computer readable storage media are provided, encoded with instructions that, when executed by a processor of a user plate function entity that is part of a set of at least two user plane function entities in a mobile core infrastructure network, cause the processor to perform operations including: obtaining (receiving) a new session notification for a session on behalf of a mobile user equipment, the new session notification including a segment routing header that includes a segment identifier for each of the at least two user plane function entities in the set; parsing the segment routing header to obtain the segment identifiers for each of the one or more other user plane function entities specified in the segment routing header; determining whether the user plane function entity can serve the session; if the user plane function entity cannot serve the session, forwarding the new session notification to a next user plane function entity in the set; if the user plane function entity can serve the session: selecting an Internet Protocol (IP) address for the session from a pool of available IP addresses; and sending a response to a session management function entity in the mobile core infrastructure network, the response including an identifier of the user plane function entity that serves the session and the IP address allocated for the session.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a session management function entity in a mobile core infrastructure network:
        obtaining a new session request to invoke a user plane function for a session on behalf of a mobile user equipment;
        selecting, from a pool of user plane function entities, a set of user plane function entities that are capable of serving the user plane function, the set including at least two user plane function entities;
        generating a new session notification that includes a segment routing header that includes a segment identifier for each of the at least two user plane function entities to indicate the set of user plane function entities, wherein the new session notification is to be received by a first user plane function entity in the set such that the first user plane function entity serves the session if it can serve the session, and otherwise the first user plane function entity forwards the new session notification to another user plane function entity in the set, and so on, until one of the user plane function entities in the set can serve the session, thereby achieving in-band load balancing among the user plane function entities in the set resulting in a selected user plane function entity to serve the session; and
        obtaining a response from the selected user plane function entity in the set that serves the session, the response including an identifier of the selected user plane function entity that serves the session and an Internet Protocol (IP) address allocated for the session.

2. The method of claim 1, wherein the IP address allocated for the session is selected from an available pool of IP address by the selected user plane function entity.

3. The method of claim 1, further comprising the session management function entity sending the new session notification to the first user plane function entity of the set.

4. The method of claim 1, further comprising the session management function entity sending the new session notification to a radio access network entity in the mobile core infrastructure network.

5. The method of claim 4, further comprising the radio access network entity sending the new session notification to the first user plane function entity in the set.

6. The method of claim 1, wherein the segment routing header includes metadata that includes information about the session to be set up for the mobile user equipment.

7. The method of claim 6, wherein the metadata indicates specific Quality of Service (QoS) information or a charging policy.

8. The method of claim 6, wherein the metadata is transported in optional Type Length Values of the segment routing header.

9. An apparatus comprising:
- a network interface to enable network communications on behalf of a session management function entity in a mobile core infrastructure network; and
- a processor coupled to the network interface, wherein the processor is configured to:
  - obtain a new session request to invoke a user plane function for a session on behalf of a mobile user equipment;
  - select, from a pool of user plane function entities, a set of user plane function entities that are capable of serving the user plane function, the set including at least two user plane function entities;
  - generate a new session notification that includes a segment routing header that includes a segment identifier for each of the at least two user plane function entities to indicate the set of user plane function entities, wherein the new session notification is to be received by a first user plane function entity in the set such that the first user plane function entity serves the session if it can serve the session, and otherwise the first user plane function entity forwards the new session notification to another user plane function entity in the set, and so on, until one of the user plane function entities in the set can serve the session, thereby achieving in-band load balancing among the user plane function entities in the set resulting in a selected user plane function entity to serve the session; and
  - obtain a response from the selected user plane function entity in the set that serves the session, the response including an identifier of the selected user plane function entity that serves the session and an Internet Protocol (IP) address allocated for the session.

10. The apparatus of claim 9, wherein the IP address allocated for the session is selected from an available pool of IP address by the selected user plane function entity.

11. The apparatus of claim 9, wherein the processor is configured to send, via the network interface, the new session notification to the first user plane function entity of the set.

12. The apparatus of claim 9, wherein the processor is configured to send, via the network interface, the new session notification to a radio access network entity in the mobile core infrastructure network, and wherein the radio access network entity sends the new session notification to the first user plane function entity in the set.

13. The apparatus of claim 9, wherein the segment routing header includes metadata that includes information about the session to be set up for the mobile user equipment.

14. The apparatus of claim 13, wherein the metadata indicates specific Quality of Service (QoS) information or a charging policy.

15. The apparatus of claim 13, wherein the metadata is transported in optional Type Length Values of the segment routing header.

16. A method comprising:
- at a user plane function entity that is part of a set of at least two user plane function entities in a mobile core infrastructure network:
  - obtaining a new session notification for a session on behalf of a mobile user equipment, the new session notification including a segment routing header that includes a segment identifier for each of the at least two user plane function entities in the set;
  - parsing the segment routing header to obtain the segment identifiers for each of one or more other user plane function entities in the set specified in the segment routing header;
  - determining whether the user plane function entity can serve the session;
  - if the user plane function entity cannot serve the session, forwarding the new session notification to a next user plane function entity in the set;
  - if the user plane function entity can serve the session:
    - selecting an Internet Protocol (IP) address for the session from a pool of available IP addresses; and
    - sending a response to a session management function entity in the mobile core infrastructure network, the response including an identifier of the user plane function entity that serves the session and the IP address allocated for the session.

17. The method of claim 16, wherein receiving comprises receiving the new session notification from the session management function entity.

18. The method of claim 16, wherein receiving comprises receiving the new session notification from a radio access network entity in the in the mobile core infrastructure network.

19. The method of claim 16, wherein parsing includes obtaining metadata from the segment routing header, wherein the metadata includes information about the session to be set up for the mobile user equipment.

20. The method of claim 19, wherein the metadata is transported in optional Type Length Values of the segment routing header.

* * * * *